(12) United States Patent
Okubo

(10) Patent No.: US 11,019,313 B2
(45) Date of Patent: May 25, 2021

(54) PROJECTION OPTICAL APPARATUS AND PROJECTOR

(71) Applicant: SEIKO EPSON CORPORATION, Tokyo (JP)

(72) Inventor: Hirofumi Okubo, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/909,090

(22) Filed: Jun. 23, 2020

(65) Prior Publication Data
US 2020/0404231 A1 Dec. 24, 2020

(30) Foreign Application Priority Data

Jun. 24, 2019 (JP) .............................. JP2019-116211

(51) Int. Cl.
*H04N 9/31* (2006.01)
*G03B 21/20* (2006.01)

(52) U.S. Cl.
CPC ....... *H04N 9/3152* (2013.01); *G03B 21/2066* (2013.01)

(58) Field of Classification Search
CPC .......................... G03B 21/2066; H04N 9/3152

USPC ........................................................... 353/99
See application file for complete search history.

(56) References Cited

U.S. PATENT DOCUMENTS

2016/0246037 A1 8/2016 Amano
2020/0292923 A1* 9/2020 Amano ................. G02B 7/182

FOREIGN PATENT DOCUMENTS

JP 2016-156986 A 9/2016

* cited by examiner

*Primary Examiner* — Jerry L Brooks
(74) *Attorney, Agent, or Firm* — Oliff PLC

(57) ABSTRACT

A projection optical apparatus includes a first lens group including a first optical axis, a first optical path deflector, a second optical path deflector, a second lens group including a second optical axis, a first lens barrel, a second lens barrel and a frame. The frame includes a frame main body and a cover frame. The frame main body includes a lens barrel attachment part including first and second openings, and first and second side parts facing each other and extending in a direction along a plane containing the first optical axis and a third optical axis between the first optical path deflector and the second optical path deflector. The cover frame is disposed at an opposite side to a lens barrel attachment part side with respect to the first and second optical path deflectors, and includes an outer circumferential part fixed to the the first and second side parts.

8 Claims, 4 Drawing Sheets

PROJECTION OPTICAL APPARATUS AND PROJECTOR

The present application is based on, and claims priority from JP Application Serial Number 2019-116211, filed Jun. 24, 2019, the disclosure of which is hereby incorporated by reference herein in its entirety.

BACKGROUND

1. Technical Field

The present disclosure relates to a projection optical apparatus and a projector that projects video light by using the projection optical apparatus.

2. Related Art

There has been a projector that enlarges video light produced by using light from a light source and projects the video light on a screen via a projection system.

JP-A-2016-156986 discloses a projector of this type (projection-type display apparatus). The projection-type display apparatus disclosed in JP-A-2016-156986 deflects the optical path by using an optical path deflector, such as a mirror, when projecting the video light produced by a light modulator (light valve) in accordance with image information on the screen.

In the projection optical apparatus, in which the optical path deflector, such as a mirror, is disposed in the middle of the optical path, a frame that holds the optical path deflector is typically a component separate from a lens barrel, and the lens barrel is bonded to the frame that folds the optical path deflector.

In the projection optical apparatus, however, a lens disposed in a position closest to the magnifying side has a large weight, so that a large load acts on a portion where the lens barrel that holds the magnifying-side lens group is bonded to the frame that holds the optical path deflector, such as a mirror. When the frame is made of resin, increasing the thickness of the frame can provide rigidity large enough to withstand the load. When the thickness of the frame is increased, however, the weight of the frame increases and the elasticity of the frame decreases, resulting in possibilities of breakage of the frame due to impact exerted when the projection optical apparatus falls and a decrease in optical performance of the projection optical apparatus due to positional shift between the optical parts.

SUMMARY

An advantage of the present disclosure is to reinforce a frame that holds an optical path deflector, such as a mirror, with no increase in weight of the frame or no decrease in elasticity of the frame.

A projection optical apparatus according to the present disclosure includes a first lens group including a first optical axis, a first optical path deflector disposed at a demagnifying side of the first lens group, a second optical path deflector disposed at the demagnifying side of the first optical path deflector, and a second lens group disposed at the demagnifying side of the second optical path deflector, the second lens group including a second optical axis which is substantially parallel to the first optical axis, a first lens barrel holding the first lens group, a second lens barrel holding the second lens group, and a frame holding the first optical path deflector and the second optical path deflector. The frame includes a frame main body and a cover frame. The frame main body includes a lens barrel attachment part that includes a first opening in which the first lens barrel is fitted and a second opening in which the second lens barrel is fitted and a first side part and a second side part facing each other and extending in a direction along a plane containing both the first optical axis and a third optical axis between the first optical path deflector and the second optical path deflector. The cover frame is disposed at an opposite side to a lens barrel attachment part side with respect to the first and second optical path deflectors, and includes an outer circumferential part fixed to the first and second side parts.

A projector according to the present disclosure includes a light modulator and the projection optical apparatus described above, which projects video light modulated by the light modulator.

DESCRIPTION OF EXEMPLARY EMBODIMENTS

Overall Configuration

Figure 1:
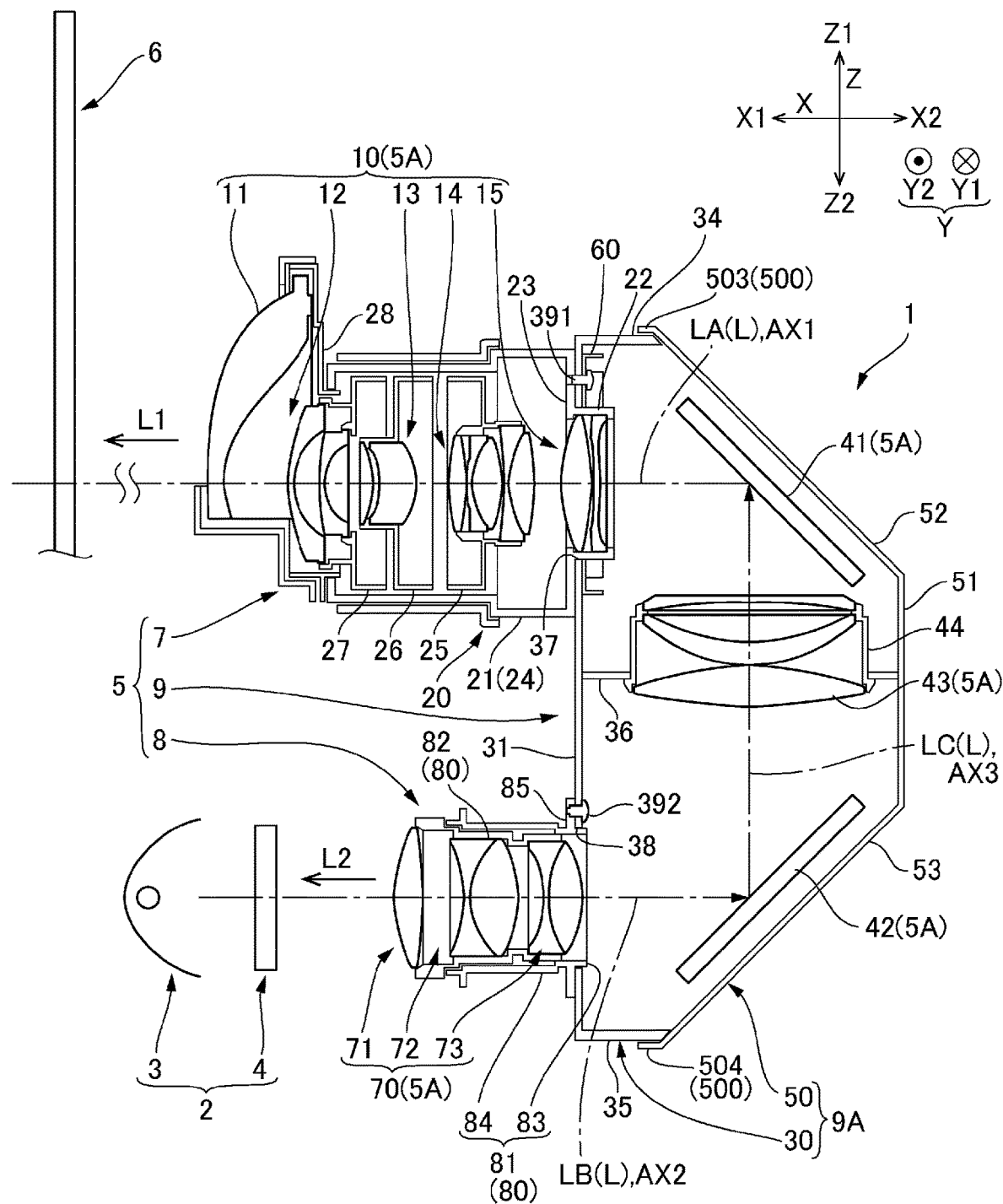
FIG. 1 is a descriptive diagram showing an internal configuration of a projection optical apparatus and a schematic configuration of a video light generator in a projector according to an embodiment of the present disclosure.
Figure 2:
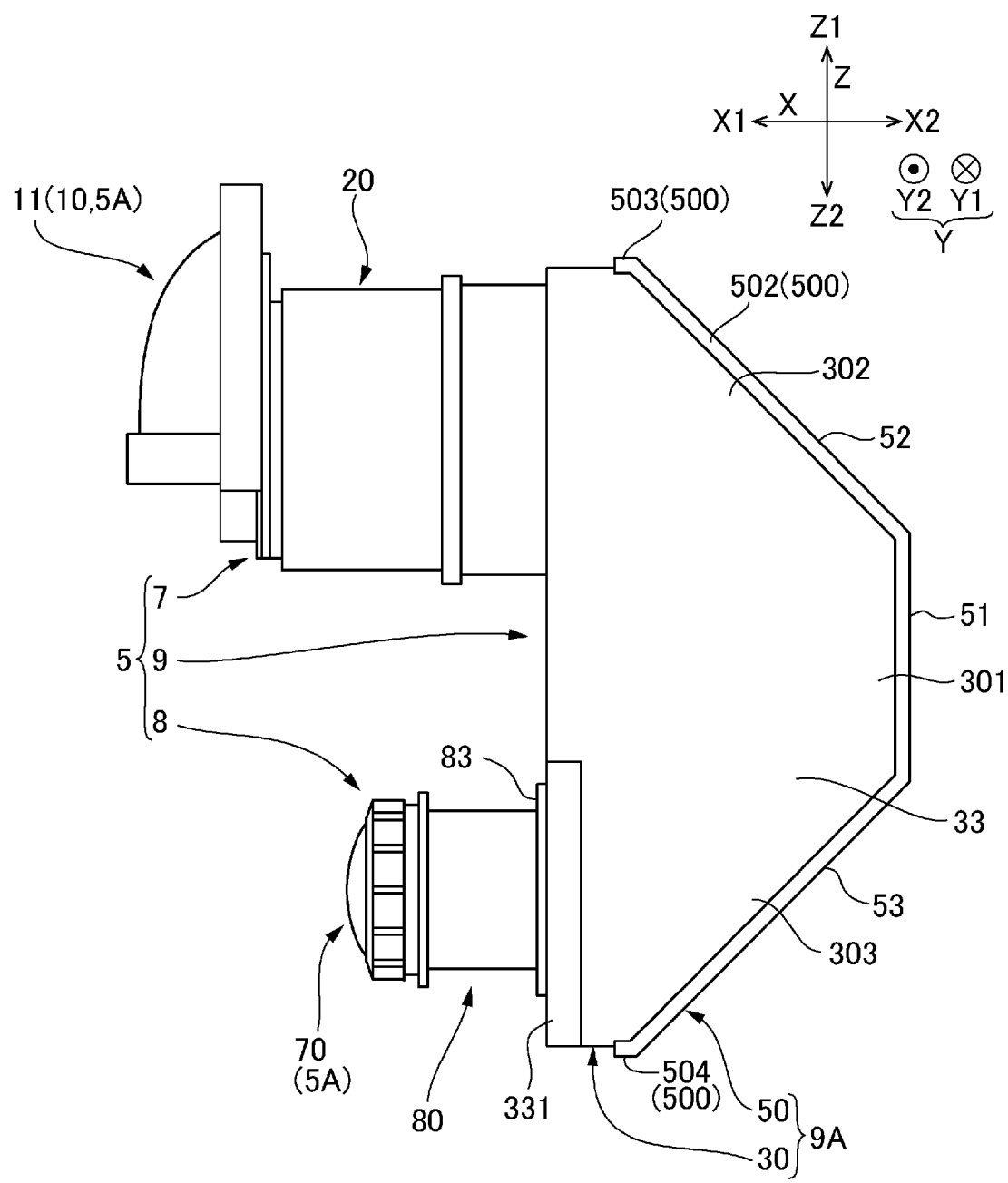
FIG. 2 is a side view of the projection optical apparatus according to the present embodiment.
Figure 3:
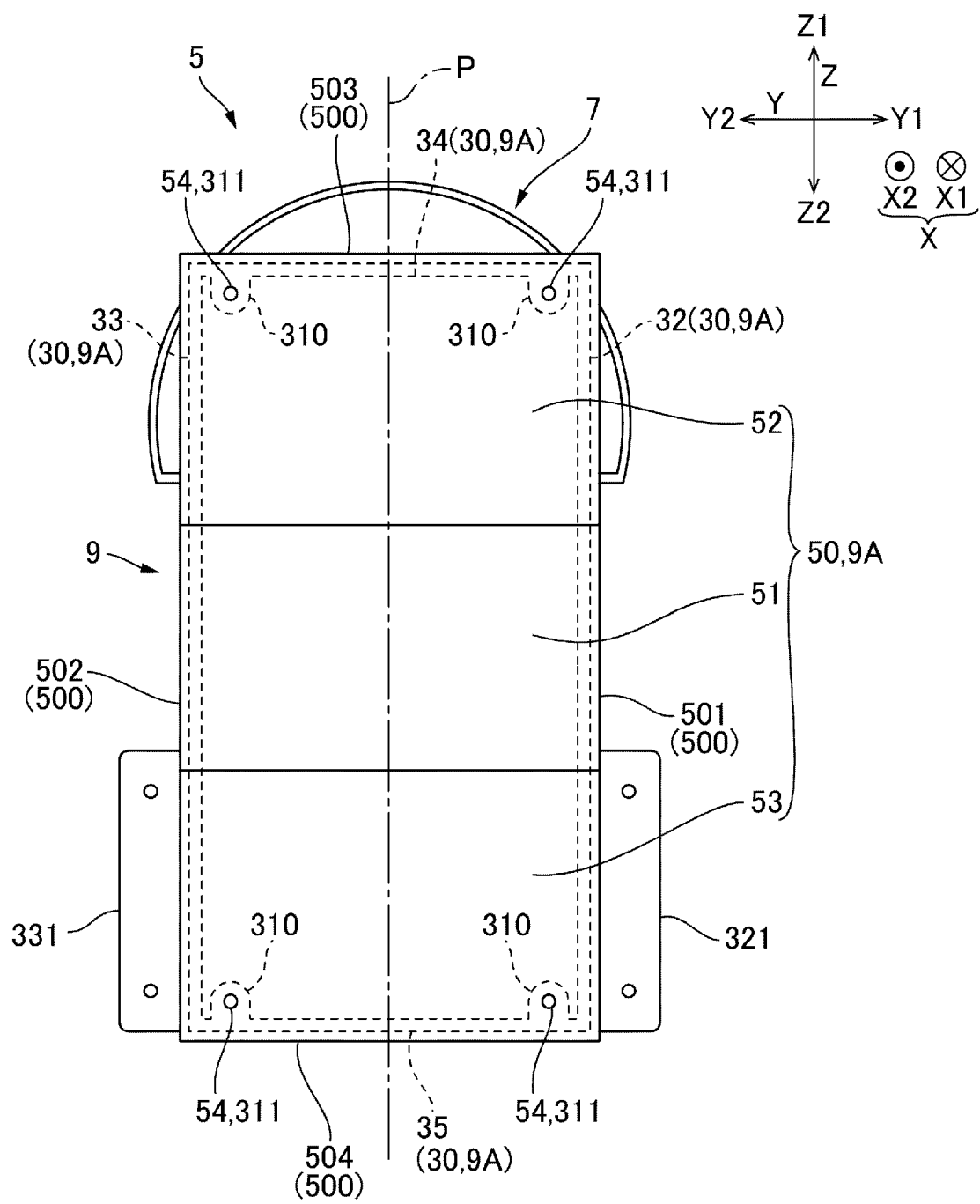
FIG. 3 is a rear view of the projection optical apparatus in FIG. 2 viewed from the side facing a cover frame.
Figure 4:
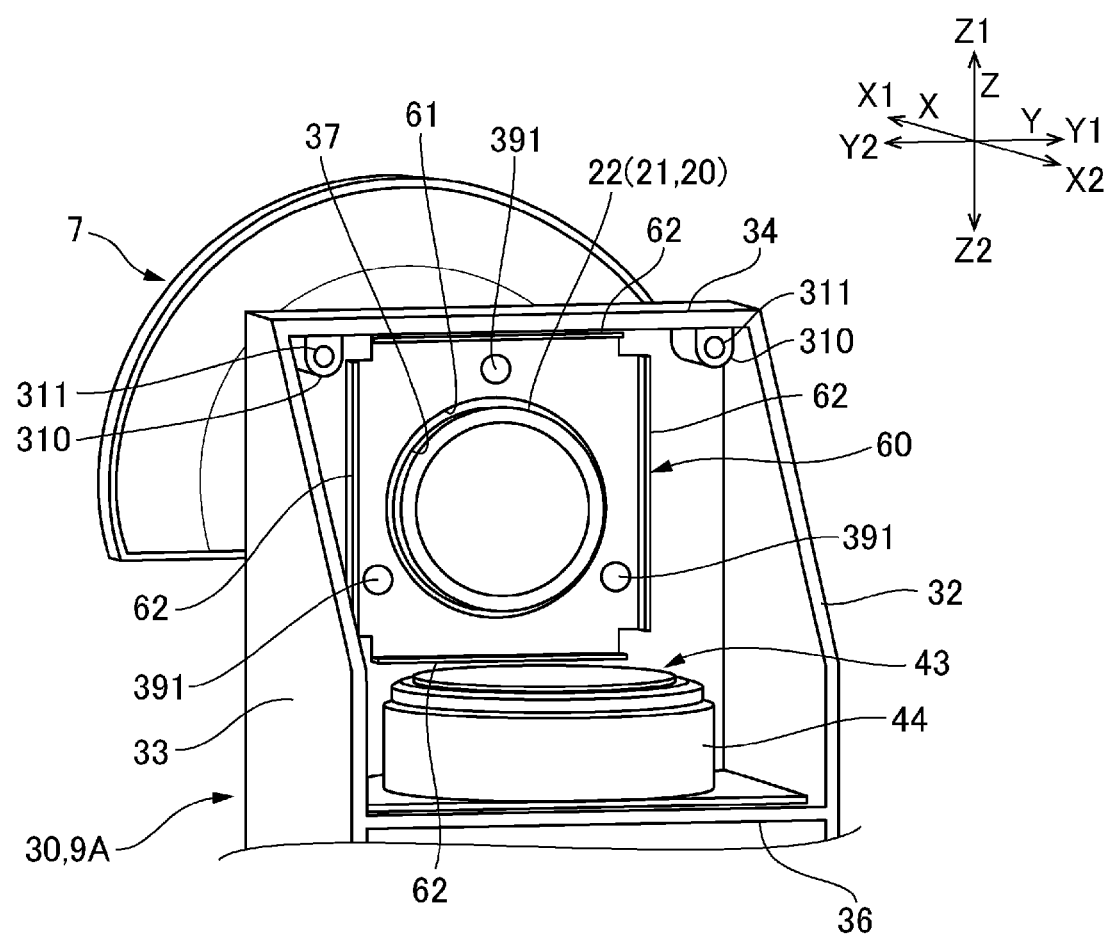
FIG. 4 is a partial perspective view of a portion where a first lens barrel is bonded to a frame main body with the portion viewed from a demagnifying side.

An exemplary embodiment of the present disclosure will be described below with reference to the drawings. FIG. 1 is a descriptive diagram showing an internal configuration of a projection optical apparatus 5 and a schematic configuration of a video light generator 2 in a projector 1 according to the present embodiment. FIG. 2 is a side view of the projection optical apparatus 5 according to the present embodiment. FIG. 3 is a rear view of the projection optical apparatus 5 in FIG. 2 viewed from the side facing a cover frame 50. FIG. 4 is a partial perspective view of a portion where a first lens barrel 20 and a frame main body 30 are bonded to each other with the portion viewed from a demagnifying side L2.

The projector 1 includes the video light generator 2 and the projection optical apparatus 5, as shown in FIG. 1. The video light generator 2 and the projection optical apparatus 5 are disposed in an exterior enclosure that is not shown. The exterior enclosure accommodates a fan for cooling the interior of the projector 1, a power supply, a controller, and other components in addition to the video light generator 2 and the projection optical apparatus 5.

The video light generator 2 includes a light source 3 and a light modulator 4. The projection optical apparatus 5 enlarges video light produced by the light modulator 4 and projects the video light on a screen 6. The light modulator 4 modulates R light (red light), G light (green light), and B light (blue light) outputted from the light source 3 in accordance with image information to produce the video light. The video light generator 2 may operate based on a scheme in which the single light modulator 4 modulates the three types of color light, the R light, the G light, and the B light, or a scheme in which three light modulators 4 are assigned to the R light, the G light, and the B light.

In the present specification described below, three directions perpendicular to one another are called a first direction X, a second direction Y, and a third direction Z. Let L be the optical path of the light from the projection optical apparatus 5, and the one side and the other side of the optical path L are defined as follows: The side via which the projection optical apparatus 5 outputs the light (light exiting side) is called a magnifying side L1; and the side via which the light enters the projection optical apparatus 5 (light incident side) is called a demagnifying side L2. The third direction Z is the vertical direction in a state in which the projector 1 is normally installed. Therefore, one side of the third direction Z is called an upper side Z1, and the other side of the third direction Z is called a lower side Z2. The projection optical apparatus 5 outputs the light in the direction opposite the direction in which the light from the video light generator 2 enters the projection optical apparatus 5. One side X1 of the first direction X coincides with the light exiting direction in which the projection optical apparatus 5 outputs the light, and another side X2 of the first direction X coincides with the light incident direction in which the light from the video light generator 2 enters the projection optical apparatus 5. The second direction Y is the width direction of the projection optical apparatus 5, with one side of the width direction called Y1 and the other side thereof called Y2.

The projection optical apparatus 5 includes a first lens unit 7, a second lens unit 8, and an intermediate unit 9, as shown in FIG. 1. The intermediate unit 9 has a shape elongated in the third direction Z. The first lens unit 7 is fixed to an X1-side portion of the intermediate unit 9 that is a portion facing the upper side Z1. The second lens unit 8 is fixed to an X1-side portion of the intermediate unit 9 that is a portion facing the lower side Z2. The video light generator 2 is disposed on the side X1 of the second lens unit 8.

The projection optical apparatus 5 includes projection system 5A, in which a first lens group 10, a first mirror 41, a second mirror 42, and a second lens group 70 are arranged sequentially from the magnifying side L1. In the present form, a third lens group 43 is disposed in the optical path between the first mirror 41 and the second mirror 42. The first lens group 10 is provided in the first lens unit 7. The first mirror 41, the second mirror 42, and the third lens group 43 are provided in the intermediate unit 9. The second lens group 70 is provided in the second lens unit 8.

In the projection system 5A, a first optical axis AX1, which is the optical axis of the first lens group 10, is substantially parallel to a second optical axis AX2, which is the optical axis of the second lent group 70. The first optical axis AX1 and the second optical axis AX2 are separate from each other in the third direction Z, and the first optical axis AX1 is located on the upper side Z1 of the second optical axis AX2. The optical path L of the light from the projection optical apparatus 5 has a first optical path section LA, which coincides with the first optical axis AX1, a second optical path section LB, which coincides with the second optical axis AX2, and a third optical path section LC, which coincides with a third optical axis AX3 perpendicular to the first optical axis AX1 and the second optical axis AX2. The third optical path section LC is the optical path section between the first mirror 41 and the second mirror 42. In the present form, the optical path L is redirected, specifically, reversed in the intermediate unit 9 to form a U-letter-shaped optical path including the third optical path section LC in the intermediate unit 9.

The first lens unit 7 includes the first lens group 10, which is provided in a position closest to the magnifying side L1, and a first lens barrel 20, which holds the first lens group 10.

The first lens group 10 includes a front lens 11, a lens group 12, a lens group 13, a lens group 14, and a lens group 15. The front lens 11 is a lens disposed in a position closest to the magnifying side out of the lenses in the first lens group 10. The front lens 11 is so shaped that an edge portion thereof facing the lower side Z2 is truncated, and the projection optical apparatus 5 enlarges and projects the video light via the front lens 11 toward the upper side Z1. In the present specification, the term "lens group" is not limited to a lens group formed of a plurality of lenses and may be a lens group formed of a single lens. Further, the lenses that form the first lens group 10 do not necessarily have the configuration shown in FIG. 1.

The first lens barrel 20 includes a plurality of lens barrels that hold the first lens group 10, a zoom mechanism that moves part of the plurality of lens barrels in the first optical axis AX1 relative to the other lens barrels, a focus mechanism, and other components. The first lens barrel 20 includes a fixing casing 21, which holds the lens group 15, which is a lens group located in a position closest to the demagnifying side out of the lens groups in the first lens group 10. The fixing casing 21 includes a first tube 22, which is provided at the X2-side end of the first lens group 10, an end plate 23, which extends outward from the X1-side end of the first tube 22, and a second tube 24, which extends from the outer circumferential edge of the endplate 23 toward the side X1. The lens group 15 is disposed inside the inner circumference of the first tube 22. Lens barrels 25, 26, and 27, which hold the lens groups 12, 13, and 14, are disposed inside the inner circumference of the second tube 24, and a lens barrel 28, which holds the front lens 11, is disposed at the X1-side end of the second tube 24.

The intermediate unit 9 includes a frame main body 30, the first mirror 41 and the second mirror 42, which are held by the frame main body 30, the third lens group 43, and a cover frame 50, which is fixed to an X2-side portion of the frame main body 30. The first mirror 41 and the second mirror 42 are separate from each other in the third direction Z, and the second mirror 42 is located on the lower side Z2 of the first mirror 41. The third lens group 43 is held by a third lens barrel 44 and disposed in the optical path between the first mirror 41 and the second mirror 42. In the present form, fixing the cover frame 50 to the frame main body 30 forms a frame 9A, which accommodates the first mirror 41, the second mirror 42, and the third lens group 43. The frame main body 30 and the cover frame 50 are each made of resin.

The first mirror 41 is a first optical path deflector disposed on the demagnifying side of the first lens group 10. The first mirror 41 is disposed in the first optical axis AX1. The second mirror 42 is a second optical path deflector disposed in the optical path between the first mirror 41 and the second lens unit 8. The second mirror 42 is disposed in the second optical axis AX2. The second mirror 42 inclines by 45° with respect to the second optical axis AX2 and reflects light incident from the second lens unit 8 in such a way that the light travels in the direction Z1. The first mirror 41 inclines by 45° with respect to the first optical axis AX1 and reflects the light incident from the second mirror 42 via the third lens group 43 in such a way that the light travels in the direction X1 to cause the light to enter the first lens unit 7. The first mirror 41 and the second mirror 42 thus redirect the optical path L extending toward one side of the second optical axis AX2 (side X2) toward the other side (side X1).

The frame main body 30 includes a front plate 31, a pair of side parts 32 and 33, connection parts 34 and 35, and a fixing casing 36, as shown in FIGS. 1 and 4. The front plate 31 extends in the third direction Z from the side X2 of the first lens unit 7 toward the side X2 of the second lens unit 8. The pair of side parts 32 and 33 extend toward the side X2 from the Y1-side edge and the Y2-side edge of the front plate 31, respectively. The connection part 34 connects the Z1-side ends of the side parts 32 and 33 to each other. The connection part 35 connects the Z2-side ends of the side parts 32 and 33 to each other. The fixing casing 36 is disposed between the side parts 32 and 33 in a position substantially at the center of the frame main body 30 in the third direction Z. The third lens barrel 44 is disposed in an opening provided in the fixing casing 36.

The frame main body 30 includes a first flange 321, which protrudes in the direction Y1 from the X1-side edge of the side part 32, and a second flange 331, which protrudes in the direction Y2 from the X1-side edge of the side part 33, as shown in FIGS. 2 and 3. The first flange 321 and the second flange 331 are provided at a portion of the frame main body 30 that is a portion facing the lower side Z2 and disposed on opposite sides of the second lens unit 8 in the second direction Y. The projection optical apparatus 5 is fixed to the exterior enclosure (not shown) of the projector 1 via the first flange 321 and the second flange 331.

The frame main body 30 has a first opening 37, which passes in the first direction X through a portion of the front plate 31 that is a portion facing the upper side Z1, and a second opening 38, which passes in the first direction X through a portion of the front plate 31 that is a portion facing the lower side Z2, as shown in FIG. 1. The first opening 37 is a circular opening around the first optical axis AX1 of the first lens unit 7, and the first tube 22, which is provided at the X2-side end of the first lens barrel 20, is fit in the first opening 37. The second opening 38 is a circular opening around the second optical axis AX2 of the second lens unit 8, and a first tube 83, which is provided at the X2-side end of a second lens barrel 80, which will be described later, is fit in the second opening 38. That is, the front plate 31 is a lens barrel attachment part provided with the first opening 37, in which the first lens barrel 20 is fit, and the second opening 38, in which the second lens barrel 80 is fit.

The first lens barrel 20 is so configured that the end plate 23 is in contact with an X1-side portion of the front plate 31 of the frame main body 30 and the front plate 31 and the end plate 23 are fastened to each other in screw clamping around the outer circumference of the first opening 37 at three locations separate from each other in the circumferential direction. A first reinforcing member 60, which has a rectangular shape, is disposed on the side X2 of the front plate 31 around the outer circumference of the first opening 37, as shown in FIG. 4. The first reinforcing member 60 is formed of a rectangular metal plate. A circular opening 61 is provided substantially at the center of the first reinforcing member 60, and bent parts 62, which are end portions of the metal plate that are bent toward the side X2, are formed at the outer circumferential edge of the first reinforcing member 60. When the front plate 31 and the end plate 23 are fastened to each other in screw clamping, the first reinforcing member 60 is fixed together with the front plate 31 and the end plate 23 by first fixing members 391 to a portion where the front plate 31 and the end plate 23 are bonded to each other. Disposing the first reinforcing member 60 around the outer circumference of the first opening 37 reinforces the portion where the first lens barrel 20 is bonded to the frame main body 30.

The second lens unit 8 includes the second lens group 70, which is so disposed as to be shifted from the first mirror 41 toward the demagnifying side, and the second lens barrel 80, which holds the second lens group 70, as shown in FIG. 1.

The second lens group 70 includes lens groups 71, 72, and 73. The configuration of the second lens group 70 is not limited to the configuration shown in FIG. 1. The second lens barrel 80 includes a fixing casing 81 and a lens barrel 82, which is held by the fixing casing 81, and the lens groups 71, 72, and 73 are held by the lens barrel 82. The fixing casing 81 includes a first tube 83, which is provided at the X2-side end of the fixing casing 81, a second tube 84, which is located on the side X1 of the first tube 83 and so formed as to have a diameter greater than the diameter of the first tube 83, and a flange 85, which extends outward from the first tube 83.

The second lens barrel 80 is so configured that the flange 85 is in contact with an X1-side portion of the front plate 31 of the frame main body 30. The flange 85 and the front plate 31 are fastened to each other by second fixing members 392 in screw clamping around the outer circumference of the second opening 38 at three locations separate from each other in the circumferential direction. A second reinforcing member similar to the first reinforcing member 60, which is disposed at the portion where the first lens barrel 20 is bonded to the frame main body 30, can also be disposed around the outer circumference of the second opening 38. In this case, when the front plate 31 and the flange 85 are fastened to each other in screw clamping, the second reinforcing member can be fastened together with the front plate 31 and the flange 85 by the second fixing members 392.

Cover Frame Attachment Structure

In the frame main body 30, the pair of side parts 32 and 33 are so disposed as to sandwich the first mirror 41 and the second mirror 42 on opposite sides of the second direction Y. The side part 32 is disposed on the side Y1 of the first mirror 41 and the second mirror 42. The side part 33 is disposed on the side Y2 of the first mirror 41 and the second mirror 42. The side parts 32 and 33 extend in the direction along a first plane P (see FIG. 3) containing the third optical axis AX3, which is the optical axis between the first mirror 41 and the second mirror 42, and the first optical axis AX1. In the present specification, the direction "along the first plane P" includes a direction that inclines with respect to the first plane P as well as the direction parallel to the first plane P. In the present form, the side parts 32 and 33 are parallel to the first plane P, as shown in FIG. 3, and may instead incline with respect to the first plane P. The side parts 32 and 33 are so disposed as to face each other with the first plane P sandwiched therebetween in a direction that intersects the first plane P.

The pair or connection parts 34 and 35 connect the side parts 32 and 33 to each other at two locations separate from each other in the third direction Z, as shown in FIGS. 1 and 3. The side parts 32 and 33 and the connection parts 34 and 35 are connected to the outer circumferential edge of the front plate 31 and surround the outer circumferences of the first mirror 41, the second mirror 42, and the third lens group 43. The X2-side ends of the side parts 32 and 33 and the connection parts 34 and 35 form an opening that opens toward the side X2, and the cover frame 50 is so attached as to close the opening. In the present form, an outer circumferential part 500 of the cover frame 50 is fixed to X2-side end portions of the side parts 32 and 33 and the connection parts 34 and 35. The cover frame 50 is so located as to cover the side (side X2) opposite the side (side X1) where the first opening 37 and the second opening 38, which are provided in the front plate 31, which is the lens barrel attachment part, are located with the first mirror 41 and the second mirror 42 interposed between the cover frame 50 and the first and second openings 37, 38.

The side parts 32 and 33 are so shaped that two corners thereof on the opposite sides in the third direction Z are truncated at angles equal to the inclination angles of the first mirror 41 and the second mirror 42, as shown in FIGS. 1 and 2. The X2-side edge of the side part 33 has a straight part 301, which forms a central portion of the side part 33 in the third direction Z and extends in the third direction Z, a first inclining part 302, which inclines obliquely upward with respect to the straight part 301, and a second inclining part 303, which inclines obliquely downward with respect to the straight part 301, as shown in FIG. 2. The X2-side edge of the side part 32 has the straight part 301, the first inclining part 302, and the second inclining part 303, as does the side part 33. In the present form, the first inclining part 302 is parallel to the first mirror 41, and the second inclining part 303 is parallel to the second mirror 42.

The cover frame 50 is so configured that a central portion thereof in the third direction Z protrudes toward the side X2 and is so bent at two locations as to follow the X2-side edges of the side parts 32 and 33. The cover frame 50 includes a central part 51, which extends in the third direction Z, a first inclining part 52, which is located on the upper side Z1 of the central part 51 and bent in the direction that inclines toward the side X1 by 45° with respect to the third direction Z, and a second inclining part 53, which is located on the lower side Z2 of the central part 51 and bent in the direction that inclines toward the side X1 by 45° with respect to the third direction Z. The inclination angle of the first inclining part 52 is equal to the inclination angle of the first mirror 41, and the inclination angle of the second inclining part 53 is equal to the inclination angle of the second mirror 42.

The frame main body 30 includes a plurality of fixing parts 310, which are disposed between the pair of side parts 32 and 33, as shown in FIG. 3. In the present form, the plurality of fixing parts 310 are formed of four fixing part 310 in total: two fixing parts 310 that protrude toward the Z2 side from opposite ends of the connection part 34 on the upper side Z1 that are the opposite ends in the second direction Y; and two fixing parts 310 that protrude toward the Z1 side from opposite ends of the connection part 35 on the lower side Z2 that are the opposite ends in the second direction Y. The fixing parts 310 are each a boss having a fixing hole 311, which opens toward the side X2, as shown in FIG. 4. The cover frame 50 includes two fixing holes 54, which are provided at end portions of the first inclining part 52 that are end portions facing the upper side Z1, and two fixing holes 54, which are provided at end portions of the second inclining part 53 that are end portions facing the lower side Z2. The cover frame 50 is so positioned that the four fixing holes 54 overlap with the fixing parts 310 of the frame main body 30 and is fixed to the fixing parts 310 by fixing members, such as screws.

The entire outer circumferential part 500 of the cover frame 50 is fixed to the frame main body 30 with an adhesive. The cover frame 50 is further fastened to the frame main body 30 at the four locations with screws, as described above. The outer circumferential part 500 of the cover frame 50 includes a Y1-side edge part 501, a Y2-side edge part 502, a Z1-side edge part 503, and a Z2-side edge part 504, with the Y1-side edge part 501 fixed to the straight part 301, the first inclining part 302, and the second inclining part 303 of the side part 32 with an adhesive and the Y2-side edge part 502 fixed to the straight part 301, the first inclining part 302, and the second inclining part 303 of the side part 33 with an adhesive. The Z1-side edge part 503 is fixed to the X2-side end of the connection part 34 with an adhesive, and the Z2-side edge part 504 is fixed to the X2-side end of the connection part 35 with an adhesive.

Primary Effects Provided by Present Form

The projector 1 according to the present form includes the light modulator 4 and the projection optical apparatus 5, which enlarges and projects the video light produced by the light modulator 4, as described above. The projection optical apparatus 5 includes the projection system 5A, in which the first lens group 10, the first mirror 41 (first optical path deflector), the second mirror 42 (second optical path deflector), and the second lens group 70 are arranged sequentially from the magnifying side L1 and the first optical axis AX1, which is the optical axis of the first lens group 10, is substantially parallel to the second optical axis AX2, which is the optical axis of the second lens group 70. The projection optical apparatus 5 further includes the first lens barrel 20, which holds the first lens group 10, the frame 9A, which holds the first mirror 41 and the second mirror 42, and the second lens barrel 80, which holds the second lens group 70, and the frame 9A includes the frame main body 30 and the cover frame 50. The frame main body 30 includes the front plate 31 (lens barrel attachment part), which is provided with the first opening 37, in which the first lens barrel 20 is fit, and the second opening 38, in which the second lens barrel 80 is fit, and the pair of side parts 32 and 33, which extend in the direction along the first plane P, which contains the third optical axis AX3, which is the optical axis between the first mirror 41 and the second mirror 42, and the first optical axis AX1, and are so disposed as to face each other with the first plane P sandwiched therebetween in a direction that intersects the first plane P (second direction Y). The cover frame 50 covers the side (side X2) opposite the side (side X1) where the first opening 37 and the second opening 38 are located with the first mirror 41 and the second mirror 42 interposed between the cover frame 50 and the first and second openings 37, 38, and the outer circumferential part 500 is fixed to the pair of side parts 32 and 33.

As described above, in the present form, the cover frame 50 is so disposed as to cover a side of the frame main body 30, which holds the first mirror 41 and the second mirror 42 and supports the first lens barrel 20 and the second lens barrel 80, that is the side opposite the side where the first lens barrel 20 and the second lens barrel 80 are fit, and the outer circumferential part 500 of the cover frame 50 is fixed to the side parts 32 and 33 of the frame main body 30. Deformation of the frame main body 30 can thus be suppressed, whereby the rigidity of the frame 9A can be increased with no increase in the thickness of the entire frame. An increase in weight of the frame 9A and a decrease in elasticity thereof can therefore be suppressed with the frame 9A being rigid enough to support the load of the first lens group 10, which is a heavy component. Deformation and breakage of the frame 9A due to impact exerted when the projector 1 falls can therefore be suppressed. Further, positional shift of the projection system 5A due to the impact can be suppressed, whereby a decrease in optical performance of the projector 1 can be suppressed.

In the present form, the frame main body 30 includes a plurality of fixing parts 310, the cover frame 50 is fixed to the plurality of fixing parts 310. Providing the fixing parts 310 as described above allows the cover frame 50 to be readily fixed.

The fixing parts 310 may be provided between the pair of side parts 32 and 33, as in the present form, or the cover frame 50 may be fixed to the side parts 32 and 33 via fixing parts 310 provided as part of each of the pair of side parts 32 and 33. In this case, the fixation with the aid of an adhesive may not be employed, or the fixation with the aid of an adhesive and the fixation via the fixing parts 310 may both employed. The number of fixing parts 310 is not limited to four, and the fixing parts 310 are not necessarily disposed at the four corners. Further, the fixing parts 310 are not each limited to a boss for screw fixation. For example, engagement portions for the fixation each having a snap-fit structure can be provided, and the outer circumferential part 500 of the cover frame 50 can be so fixed to the side parts 32 and 33 that the outer circumferential part 500 engages with the side parts 32 and 33.

In the present form, the outer circumferential part 500 of the cover frame 50 is fixed to the pair of side parts 32 and 33 with an adhesive. The adhesive-based fixation allows the side parts 32 and 33 to be integrated with the cover frame 50. The rigidity of the frame 9A can therefore be increased. Further, employing both the fixation via the fixing parts 310 and the fixation with the aid of an adhesive can further increase the rigidity of the frame 9A. Instead, the fixation can be performed only with an adhesive with no fixing parts 310 provided. The adhesive application range may be only part of the outer circumferential part 500. For example, out of the outer circumferential part 500 of the cover frame 50, the Y1-side edge part 501 and the Y2-side edge part 502, which are each a long-side edge part, may be fixed to each other with an adhesive, but the Z1-side edge part 503 and the Z2-side edge part 504 may not be fixed to each other with an adhesive.

In the present form, the frame main body 30 includes the pair of connection parts 34 and 35, which connect the pair of side parts 32 and 33 to each other at two locations separate from each other in the direction along the first plane P. The entire outer circumferential part 500 of the cover frame 50 is fixed to the pair of side parts 32 and 33 and the pair of connection parts 34 and 35. As described above, fixing the entire outer circumferential part 500 of the cover frame 50 to the frame main body 30 allows an increase in the rigidity of the frame 9A.

What is claimed is:

1. A projection optical apparatus comprising:
   a first lens group including a first optical axis;
   a first optical path deflector disposed at a demagnifying side of the first lens group;
   a second optical path deflector disposed at the demagnifying side of the first optical path deflector;
   a second lens group disposed at the demagnifying side of the second optical path deflector, the second lens group including a second optical axis which is substantially parallel to the first optical axis;
   a first lens barrel holding the first lens group;
   a second lens barrel holding the second lens group; and
   a frame holding the first optical path deflector and the second optical path deflector,
   wherein the frame includes a frame main body and a cover frame,
   the frame main body includes
   a lens barrel attachment part including a first opening in which the first lens barrel is fitted and a second opening in which the second lens barrel is fitted and
   a first side part and a second side part facing each other and extending in a direction along a plane containing both the first optical axis and a third optical axis between the first optical path deflector and the second optical path deflector,
   the cover frame is disposed at an opposite side to a lens barrel attachment part side with respect to the first and second optical path deflectors, and includes an outer circumferential part fixed to the first and second side parts, and
   the entire outer circumferential part of the cover frame is fixed to the first and second side parts with an adhesive.

2. The projection optical apparatus according to claim 1, wherein the frame main body further includes a plurality of fixing parts, and
   the cover frame is fixed to the plurality of fixing parts.

3. The projection optical apparatus according to claim 1, wherein the frame main body further includes a first connection part and a second connection part connecting the first and second side parts to each other, and
   the entire outer circumferential part of the cover frame is fixed to the first and second side parts and the first and second connection parts.

4. The projection optical apparatus according to claim 1, wherein the entire outer circumferential part of the cover frame engages with the first and second side parts.

5. A projector comprising:
   a light modulator; and
   the projection optical apparatus according to claim 1, which projects video light modulated by the light modulator.

6. A projection optical apparatus comprising:
   a first lens unit having a first lens group, and a first lens barrel which holds the first lens group;
   a second lens unit having a second lens group, and a second lens barrel which holds the second lens group;
   a second optical path deflector that reflects light incident from the second lens group;
   a first optical path deflector that reflects the light from the second optical path deflector to enter the first lens group;
   a frame main body that holds the first lens barrel, the second lens barrel, the first optical path deflector and the second optical path deflector, and has an opening disposed in a backside of the second optical path deflector; and
   a cover frame that closes the opening of the frame main body and is fixed to the frame main body,
   wherein the frame main body has a pair of a first side part and a second side part facing each other, and
   the cover frame has an outer circumferential part which is fixed to the first side part and the second side part with an adhesive.

7. The projection optical apparatus according to claim 6, wherein the frame main body has a front plate holding the first optical path deflector and the second optical path deflector.

8. A projector comprising:
   a light modulator; and
   the projection optical apparatus according to claim 6,
   wherein video light modulated by the light modulator enter to the second lens unit of the projection optical apparatus.

* * * * *